United States Patent [19]
Kitahara et al.

[11] Patent Number: 5,353,398
[45] Date of Patent: Oct. 4, 1994

[54] GROUP WORKING SYSTEM HAVING OPERATOR DISCRIMINATING FUNCTION

[75] Inventors: Chiho Kitahara, Yokohama; Takeshi Ishizaki, Sagamihara; Yoshiyuki Nakayama, Yokohama; Kenjiro Mori, Sagamihara; Tadashi Yamamitsu; Masami Kameda, both of Hadano, all of Japan

[73] Assignee: Hitachi, Ltd., Tokyo, Japan

[21] Appl. No.: 36,235

[22] Filed: Mar. 24, 1993

[30] Foreign Application Priority Data

Mar. 24, 1992 [JP] Japan .................. 4-065746

[51] Int. Cl.⁵ .............................................. G06F 3/14
[52] U.S. Cl. ........................................ 395/153; 395/161
[58] Field of Search ............... 395/153, 900, 163, 161; 364/200

[56] References Cited

U.S. PATENT DOCUMENTS 5,008,853  4/1991  Bly et al. ................ 395/153 X
5,091,868  2/1992  Pickens et al. .......... 395/153 X Primary Examiner—Gary V. Harkcom
Assistant Examiner—Cliff Nguyen Vo
Attorney, Agent, or Firm—Antonelli, Terry, Stout & Kraus

[57] ABSTRACT

A group working system includes a plurality of work stations interconnected through a network and each having a multi-window function. Each work station is provided with a group working user interface program executed under the control of a control program for transferring control information for a group work with the other work stations. When input operation is performed for a window of a group working mode in any one of the work stations, indication information for identifying an operator or work station performing the input operation is output to an additional window which is paired with the above-mentioned window. By making reference to the indication information, each user can avoid conflict in the input operation to the same window of the group working mode with other users.

16 Claims, 16 Drawing Sheets

GROUP WORKING SYSTEM HAVING OPERATOR DISCRIMINATING FUNCTION

CROSS-REFERENCE TO RELATED APPLICATIONS

The present application relates to U.S. applications Ser. No. 07/938,593 filed on Sep. 3, 1992 entitled "JOINT INFORMATION PROCESSING INCLUDING PLURAL TERMINALS" which is a continuation of Ser. No. 07/350,850 filed on May 12, 1989, now abandoned; Ser. No. 07/614,087 filed on Nov. 15, 1990 entitled "JOINT INFORMATION PROCESSING SYSTEM COMPRISING A PLURALITY OF TERMINAL APPARATUSES GUARANTEEING IDENTICALNESS OF DATA PROCESSING RESULTS"; Ser. No. 07/741,952 filed on Aug. 8, 1991 entitled "METHOD AND SYSTEM FOR STORING AND RETRIEVING COLLABORATIVELY PROCESSED INFORMATION", and Ser. No. 07/965,153 filed on Oct. 22, 1992 entitled "GROUP WORKING SYSTEM AND DISPLAY CONTROL METHOD THEREFOR". The disclosures of these applications are incorporated herein by reference.

BACKGROUND OF THE INVENTION

The present invention relates generally to a group working system or an electronic conversation system (also referred to as a teleconferencing system). More particularly, the present invention is concerned with a group working system or teleconferencing system which includes a plurality of work stations (terminals) interconnected by a network and in which users located remotely form one another can perform group work (joint work) such as conference, meeting or the like by referencing common materials generated on display screens of the respective work stations.

DESCRIPTION OF THE RELATED ART

A conference system in which a plurality of persons can participate in an electronic conversation through the medium of respective work stations or terminals each incorporating a data processing function is reported, for example, in "Distributed Multiparty Desktop Conferencing System: MERMAID": the IEICE (The Institute of Electronics, Information And Communication Engineer) Technical Report Office System, Vol. 89, No. 190, "MERMAID: Distributed Multiparty Desktop Conferencing System": The 38th National Society (First Half of 1989) of the Information Processing Society of Japan, and "Multimedia Desktop Conversation System": IEICE Information Network, Vol. 87, No. 321. In these systems known heretofore, a shared or common display of each work station which provides a place for conference is presented or managed by a conference control system provided separately form the work stations, wherein data writing to the common display is limited to a particular user (work station) who has a privilege of operation at that time point.

On the other hand, in the system in which software for controlling a group work such as a conference is allocated to each work station, wherein a variety of application programs prepared by the user can be utilized for personal use (i.e., in a local mode) or used for performing a group work through cooperation of a plurality of work stations (i.e., in a group working mode), any one of the users of the work stations can freely perform input operation to a window generated on a CRT display of the station in which application programs operate or run in a group work mode (this window will hereinafter be referred to as the group working window). This type of information processing system for group work is also referred to as the teleconferencing system.

In the teleconferencing system in which the input operation to the group working window can freely be performed, there arises a problem that when a plurality of users perform respective input operations to a same group working window at substantially the same time, the contents as displayed may contradict to those intended by the individual operators, because the display in the group working window reflects the results of the input operations performed by the plurality of users.

SUMMARY OF THE INVENTION

An object of the present invention is to provide a group working system or a teleconferencing system in which a plurality of users can perform operations at will to one group working window and in which conflict among the input operations to the same window can easily be detected by the users of the individual work stations.

In view of the above and other objects which will become apparent as description proceeds, there is provided according to an aspect of the present invention a group working system or teleconferencing system which includes a plurality of work stations (terminal apparatuses) interconnected by a network, wherein each of the work stations is provided with a facility for automatically detecting which of users (or work stations) are currently performing input operation to the group working window, to thereby display identification information of the currently operating user on a display screen of each work station.

According to another aspect of the present invention, there is provided a group working or teleconferencing system in which each of the work stations includes a facility for generating an additional window in correspondence to the window of the group working mode (i.e., the group working window), wherein information for identifying the operator is displayed in the additional window.

In a preferred mode for carrying out the invention, display of the operator identifying information may be realized by assigning previously peculiar graphic elements or colors, for example, to the work stations or users, respectively, wherein the graphic element or color peculiar to the user performing operation is output to a particular area or an input character area on the display screen.

According to the teaching of the present invention, the identification information such as name, graphic element or color peculiar to the user who performs operation to the group working window is automatically displayed in the course of executing a group work, to thereby allow the state of conflict among the users in the window operation to be easily determined. The user can refrain input operation to the group working window when it is being operated by other user, whereby information or content displayed on the group working window can be protected against confusion which may otherwise be brought about due to the conflict in the window operation.

DESCRIPTION OF THE PREFERRED EMBODIMENTS

Now, the present invention will be described in detail in conjunction with a preferred or exemplary embodiment thereof by reference to the drawings on the assumption that the invention is applied to an electronic conversation system equipped with a group working user interface function for displaying operator or user identification information.

Figure 1:
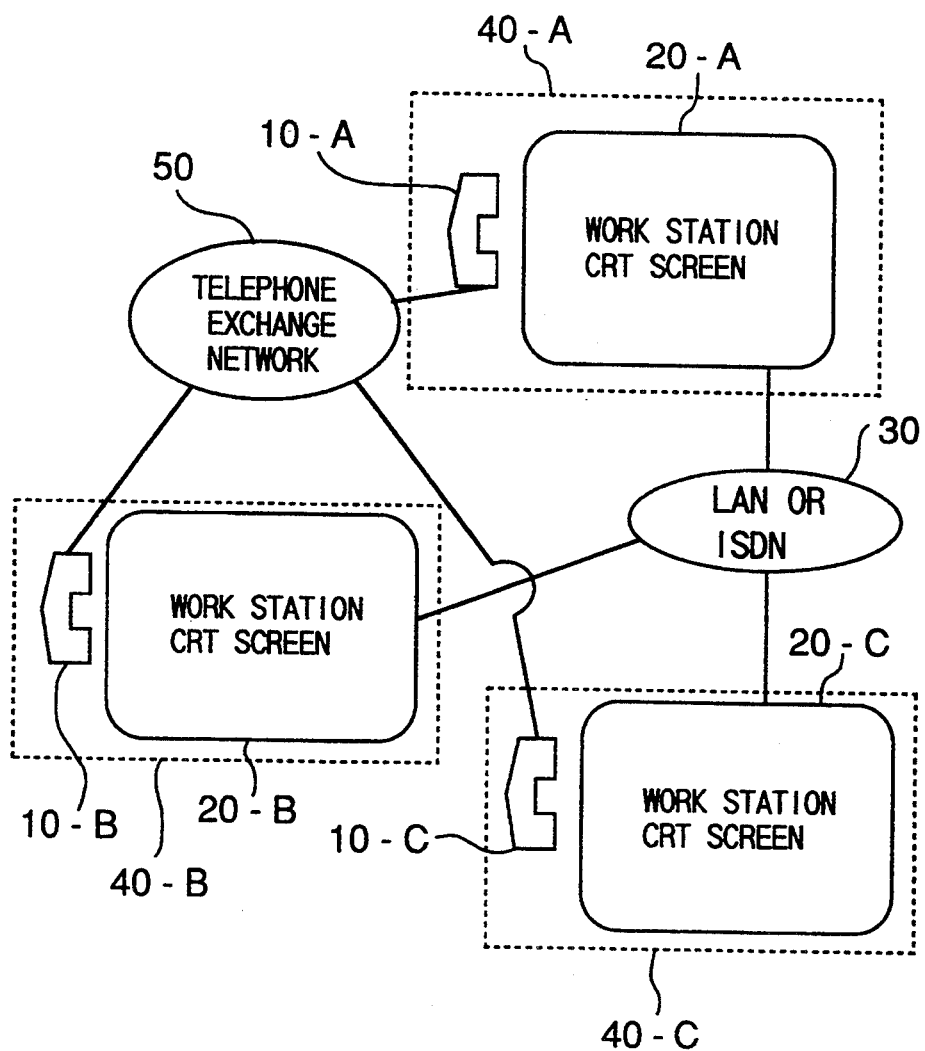
FIG. 1 is a block diagram showing a general arrangement of an electronic conversation system according to an embodiment of the present invention.

FIG. 1 diagrammatically shows a general arrangement of an electronic conversation system also known as a teleconferencing system which includes three work stations 40-A, 40-B and 40-C (denoted collectively by 40) which are interconnected via a communication network 30.

As the communication network 30 employed to this end, a LAN (Local Area Network), an ISDN (Integrated Services Digital Network) or the like can be adopted. Parenthetically, any particular limitation is imposed concerning the number of work stations which can be interconnected.

The work stations 40 have respective CRT screens 20-A, 20-B and 20-C (generally denoted by 20). On each of the CRT screens, there can be generated a window in a "local mode", a window in a "group working mode" for displaying data required for conference and other purposes by making use of a multi-window function, which will be described later on. Further, the work stations 40 are equipped with respective telephone sets 10-A, 10-B and 10-C (generally denoted by 10) which are interconnected through a telephone exchange network for the purpose of supplementally aiding or promoting the conference performed through the medium of the displays by the conversation through the telephone exchange network.

Figure 2:
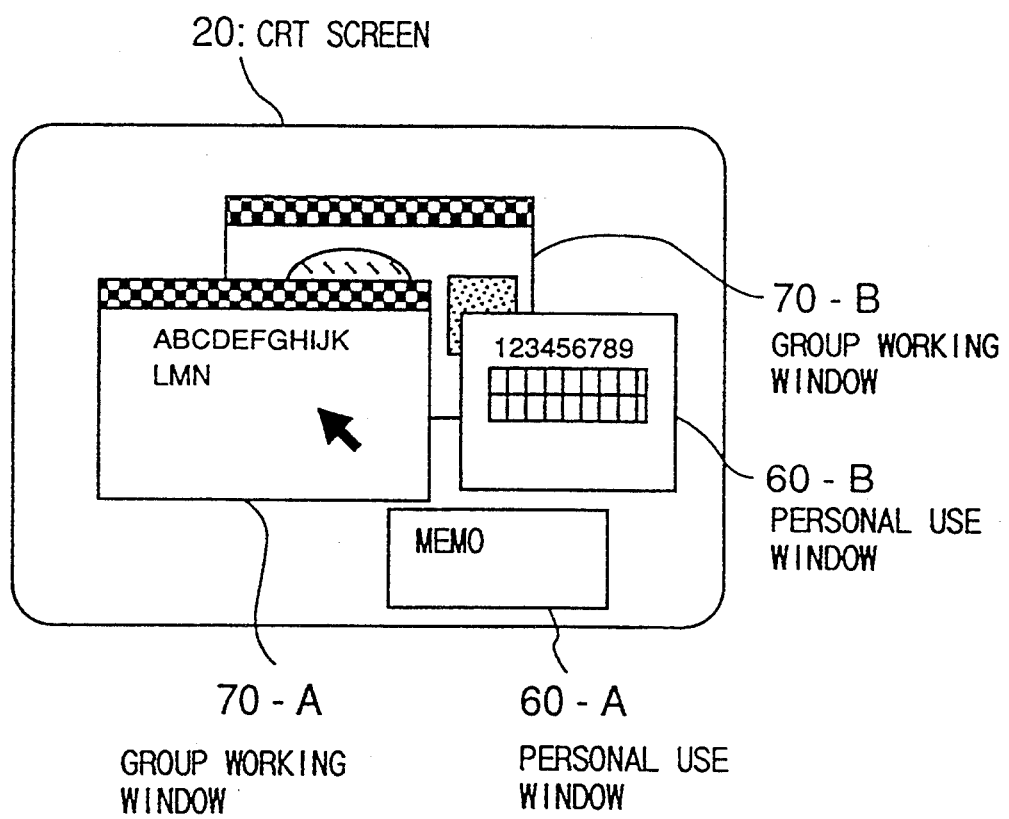
FIG. 2 is a diagram for illustrating, by way of examples, windows generated on a CRT screen of a work station in the course of performing an electronic conversation.

FIG. 2 illustrates, by way of examples, windows generated on the CRT screen 20 of the work station.

The windows 60-A and 60-B (generally designated by 60) are "personal use windows" for displaying results (materials or data) of processings performed by application programs (also referred to as AP in abbreviation) in the local mode by a user for personal purposes independent of the electronic conversation. On the other hand, the windows 70-A and 70-B (collectively designated by 70) are "group working windows" for displaying the contents of materials for group use which are results of the processings performed by application programs or APs of the group working mode.

The APs of the group working mode are placed under the control of a group working (electronic conversation) control program, as described hereinafter by reference to FIG. 4, wherein a command issued to an AP of the group working mode at one work station is transmitted to a group working mode AP' of other work station which corresponds to the above-mentioned AP by utilizing a function of the group working program. As a result, the contents of displays generated in the group working windows at a plurality of work stations undergo changes in linkage to one another.

For the group working window 70, a display processing is performed allowing the user to discriminate the group working window 70 from the personal use window 60 by making different the color of an upper region of the group working window 70 from that of the other local mode window, by way of example.

The personal use window 60 and the group working window 70 may be generated on the CRT screen in arbitrarily selected numbers, respectively. Further, by changing over the AP operation modes within a single window, the personal use window may be changed over to the group working window or vice versa. In that case, the display processing for making different the color of the upper region of the window for the purpose of mode discrimination as mentioned above is performed in accompanying the change-over of the AP modes.

Figure 3:
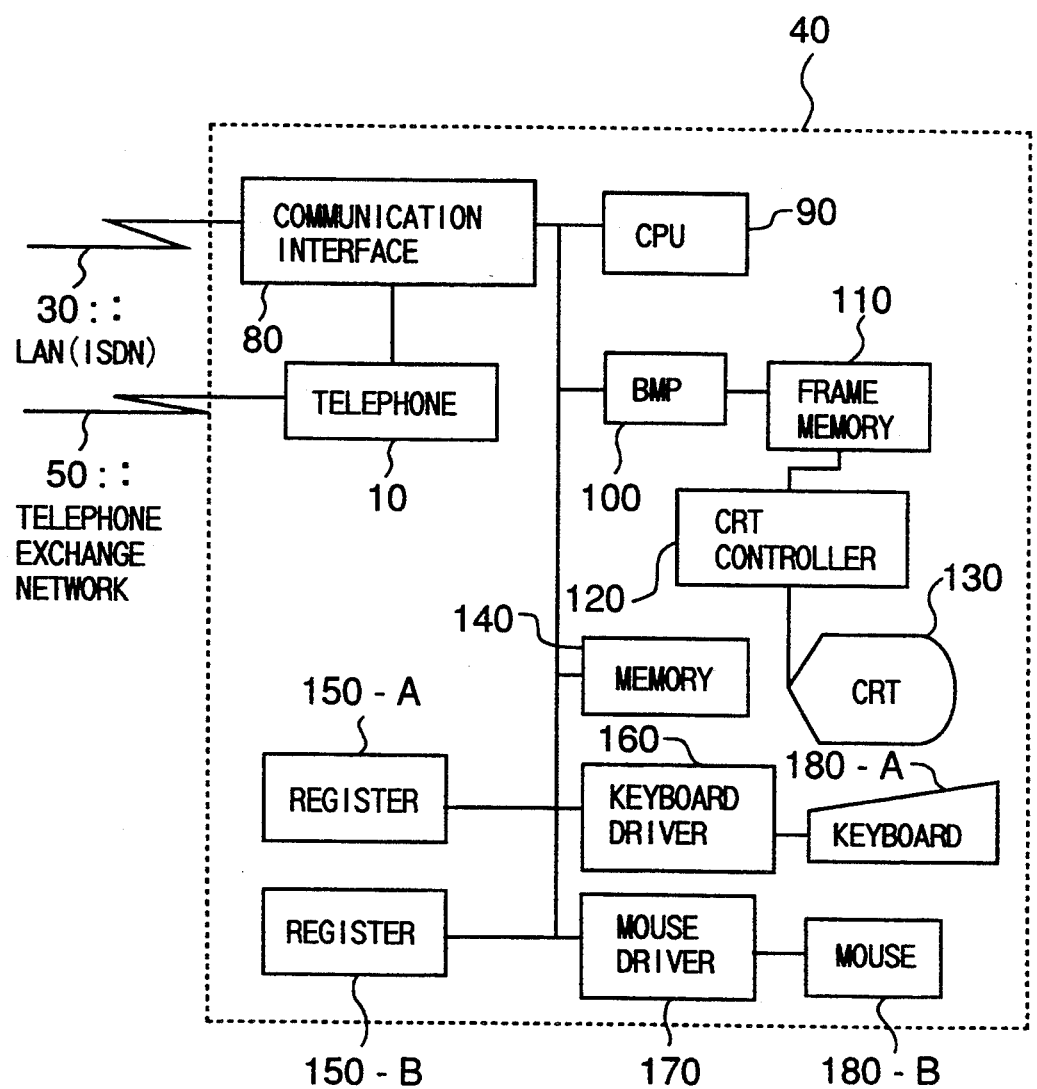
FIG. 3 is a block diagram showing a hardware structure of a work station constituting a part of the electronic conversation system.

FIG. 3 diagrammatically shows a basic structure of a work station 40 constituting a part of the group working system according to an embodiment of the invention.

In the figure, reference numeral 140 denotes a memory for storing a variety of programs and data, numeral 90 denotes a central processing unit (CPU) for executing data processing in accordance with program instructions read out from the memory 140, and a numeral 100 denotes a bit map processor (BMP) for writing the content to be output onto the CRT screen in a frame memory 110 in accordance with an instruction executed by the CPU 90. The content of the frame memory 110 is read out by a display controller 120 to be displayed on CRT (output unit) 130.

Further, reference symbol 180-A denotes a keyboard which constitutes one of the input devices 180, a numeral 160 denotes a keyboard driver 160 for registering codes input from the keyboard in a register 150-A, a reference numeral 180-B denotes a mouse constituting another one of the input devices, and a numeral 170 denotes a mouse driver 170 for storing codes input through the mouse 180-B in a register 150-B.

Each work station 40 is connected to the LAN or ISDN by way of a communication interface unit 80, while the telephone set 10 is connected to the telephone exchange network 50. Incidentally, when the ISDN is employed as the communication network 30, the output of the telephone set 10 is delivered to the network 30 by way of the communication interface unit 80. In the case of the instant embodiment, the telephone set 10 is adapted to be activated from the CPU 90.

Figure 4:
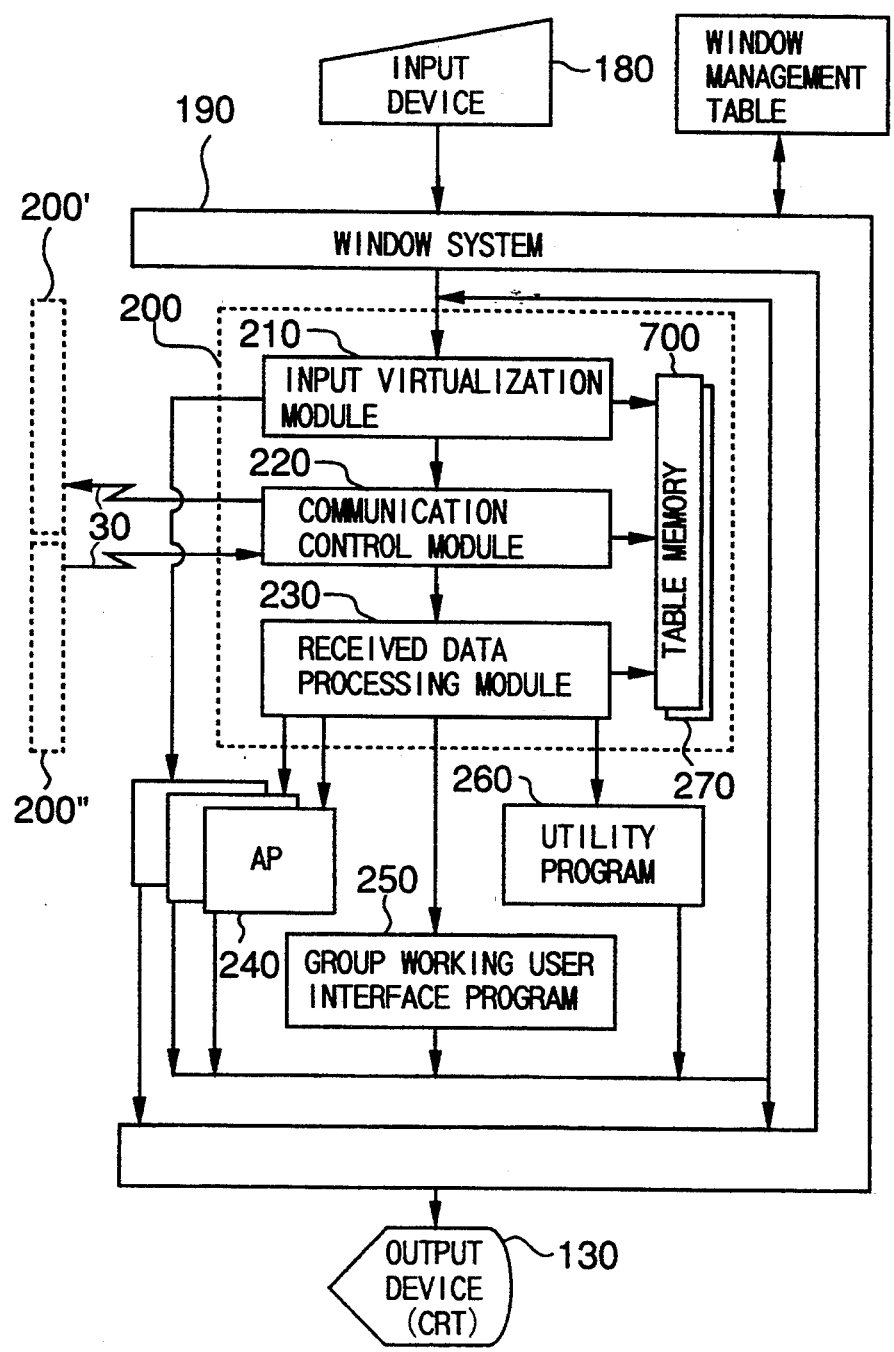
FIG. 4 is a diagram showing a basic structure of software equipped in each of the work station.

FIG. 4 diagrammatically shows basic structures of various software executed by the CPU 90 of each work station and mutual relations among the software.

In the figure, a reference numeral 200 denotes a group work control program. The interface between this group work control program 200, the input device 180 and the output device 130 can be implemented by a window system 190.

The group work control program 200 includes an input virtualization module 210, a communication control module 220 and a received data processing module 230.

The communication control module 220 is connected to communication control modules 220 of other work stations through the communication interface 80 (FIG. 3) and the communication network 30. By logically interconnecting the communication control modules of plural work stations connected to the network 30, a communication path for group working information is formed for enabling information exchange among the group work control programs. In the individual work stations interconnected via the communication path for group working information, application programs (AP) 240 set in the group working mode as well as the group working windows 70 within which these APs operate can be inter-linked under the control operation of the group work control programs 200 of the respective work stations, whereby the AP processing result of a same content (display output) can be displayed on the CRT screens of the participants (work stations), respectively.

When data is input by a user or participant through the input device 180, the data is delivered to the group work control program 200 by way of the widow system 190. When the above-mentioned data as input is destined for the window 70 of the group working mode (i.e., group working window), the group work control program 200 distributes this data to the group work control programs 200' of the other work-stations, respectively, via the communication network 30.

Each of the input data supplied to the group work control program 200 through the window system 190 contains an identifier for specifying a program or a window which is destined to process the data.

Each group work control program 200 makes decision for the input data (inclusive of commands) generated in the associated station as well as for the input data generated in other work station (by the group work control program 200") and received via the communication path for group working information (communication network 30) as to whether these data are to be processed by the above-mentioned group working program 200 itself or by other program such as the AP 240, a utility program 260 or a group working user interface program 250 or the like. If the input data is to be processed by the other program, the data is delivered to the relevant program.

The utility program 260 is a program which is prepared for facilitating the use of the AP 240 by the user. More specifically, the utility program 260 serves, for example, to display within the window of the AP 240 pointing objects (PO) which are assigned to the individual participants, respectively, so that by moving the pointing objects by operating the mouses or cursors correspondingly, a group work can be performed while pointing out same locations on the CRT screens of the individual work stations by the users, respectively. This sort of utility program may be referred to as the PO control program.

Of the modules which constitute the group work control programs 200, the input virtualization module 210 serves to convert the input data delivered from the window system into a data protocol (virtual input data) for the group work control program by adding a header to the input data, as described hereinafter by reference to FIG. 6, and to transfer the data protocol or virtual input data 330 resulting from the conversion to the communication control module 220. In this conjunction, it should be mentioned that in case the input data is for the personal user mode AP, the data is not transferred to the communication control module 220 but transferred directly to that AP.

One of the roles which the communication control module 220 plays is to transmit the input data generated in a given one of the work stations to the group work control programs 200' of the other work stations or other programs placed under of the control the group work control program 200' (such as AP 240', utility program 260, AP group working user interface program 250' and the like). Another role of the communication control module 220 is to distribute the input data originating in the associated work station or the input data received from the other work station(s) to other programs 240, 260 and 250 which are under the control of the group work control program 200 through the received data processing module 230.

Parenthetically, the corresponding relationship between an ID number of a window and an AP running within that window differs from one work station to another. Accordingly, when distribution of the input data to the APs is performed on the basis of the window identifiers assigned to the data, there arises the necessity for converting of the window identifier of the input data received from the other work station. Such conversion of the window identifier may be realized by assigning a window identifier dedicated to the electronic conversation control (common window identifier) to the group working window upon inter-station communication performed when one window is added as a new group working window and by storing in the form of a table the correspondence relation between the group working window identifier and the window identifier for the window control in the associated work station (i.e., local window identifier). In this way, the conversion of the window identifier can be effected by consulting the above-mentioned table.

The received data processing module 230 serves to transfer the virtual input data 330 received from the communication control module 220 to the relevant one of the AP 240, the utility program 260 or the group working user interface program 250 in the intact form or by restoring the virtual input data 330 to the original form. The AP 240, the utility program 260 or the group working user interface program 250 performs predetermined data processing on the basis of the input data received through the procedure described above, the result of which is then output to the output device 130 through the window system 190.

Figure 5:
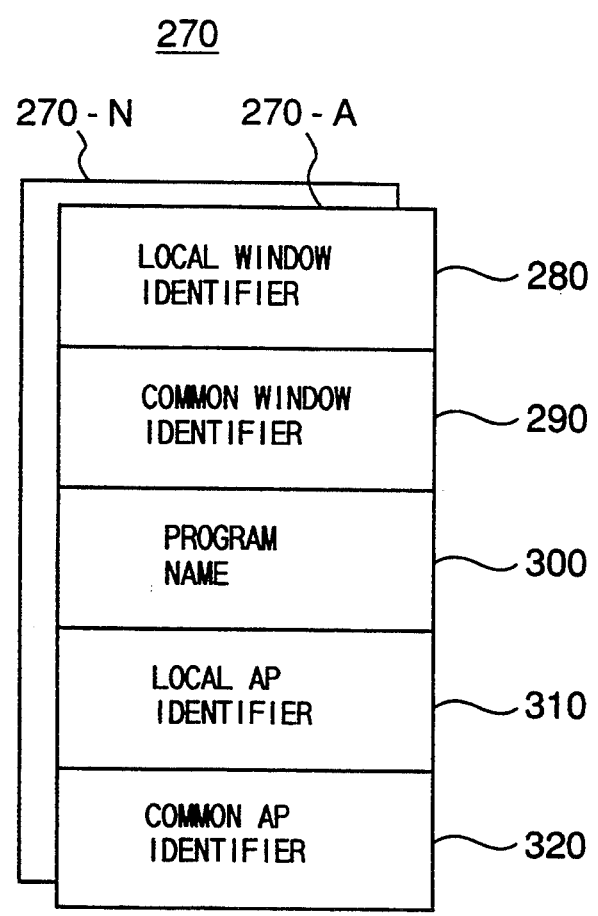
FIG. 5 is a diagram showing a structure of table storing AP identifiers and window identifiers.

FIG. 5 shows a structure of an AP-window identifier table 270. This table 270 includes a plurality of table records 270-A to 270-N prepared in correspondence to the individual windows, respectively, in which APs are to run. When one-and the same AP is to be executed within two windows, separately, and the results of the processing are to be displayed independently in the windows, respectively, the table 270 for two records is prepared for this AP.

The APs operated in the group working system according to the present invention include the personal use APs which are destined to be utilized personally by the user of the individual work stations independent of the group working and the group use APs destined for the group working, i.e., the APs to be utilized in linkage among the work stations.

For the group use AP, it is necessary that all of the work stations operate in linkage, regardless of the work station in which the input operation is performed for the group use AP, so that same results of processings can be obtained throughout all the work stations in response to the input data. In order to satisfy this necessity, the individual work stations participating in the group working have to be capable of recognizing the operation modes of the respective APs running in these work stations and informing the start and the finish of operation of the group use AP to one another.

According to the present invention, each work station is adapted to store the local AP identifier 310 as the table record for the personal use AP while storing the local AP identifier 310 and the common AP identifier 320 as the table records for the group use AP, respectively, in the AP-window identifier table 270 which is provided for storing the correspondence relations between the local window identifiers 280 and the operation modes, so that discriminative identification of the operation modes of the individual APs and the interlinked control of the group use AP can be realized.

When one AP is activated, the group work control program 200 registers the program name 300 of the activated AP in the AP-window identifier table while setting the local AP identifier 310 for that AP by making use of the function of the input virtualization module 210. The local AP identifiers 310 may be represented, for example, by sequential numbers in the order in which the corresponding APs are activated.

Now, it is assumed that the user of a given work station 40-i designates one application program APn and inputs a command for starting operation of that application program in the group use mode. In that case, the input virtualization module 210 of the group work control program 200 of that work station 40-i searches the AP-window identifier table 270 for an idle or unoccupied identifier number to be assigned to the aforementioned APn, to thereby establish the common AP identifier 320 and the common window identifier 290. Further, the common AP identifier 320, the common window identifier 290 and the program name 300 of the aforementioned APn are informed to the other work stations via the communication path for the group working information.

In the other work station 40-i which received the information mentioned above, the received data processing module 230 of the group work control program 200 activates the application program APn having the program name 300 designated by the information or message mentioned above. At that time, a new record for the application program APn is created in the AP-window identifier table 270 and a local AP identifier 310 is assigned thereto, while obtaining the local window identifier 280 from the window system, to thereby establish correspondence between the local window identifier 280 as obtained and the local AP identifier 310, whereon the common AP identifier 320, the window identifier 290 and the program name as informed are stored.

When data is input to a certain widow Wi through operation by the user in the work station, the associated group work control program 200 refers to the AP window identifier table 270 with the aid of the local window identifier which is assigned to the input data mentioned above by the window system 190, to thereby check the operation mode of the application program APi which is running within the window Wi. In case the common AP identifier 320 is set in the table 270 for the program APi, decision is made that the program APi is being executed in the group use mode, whereon a group work control data protocol (message) is generated for delivering the above-mentioned input data onto the communication path for the group working information. This message is output to the other work stations in the form of a protocol having the common AP identifier 320 and the common window identifier 290.

When the group work control program 200 receives the message indicating the input data to the APi of the group use mode which is generated by other work station from the communication path, the received data processing module 230 determines the local AP identifier 310 of the APi' which is to process the input data and the local window identifier 320 from the AP-window identifier table 270, to thereby transfer the input data to the application program APi' of the work station now under consideration.

Figure 6:
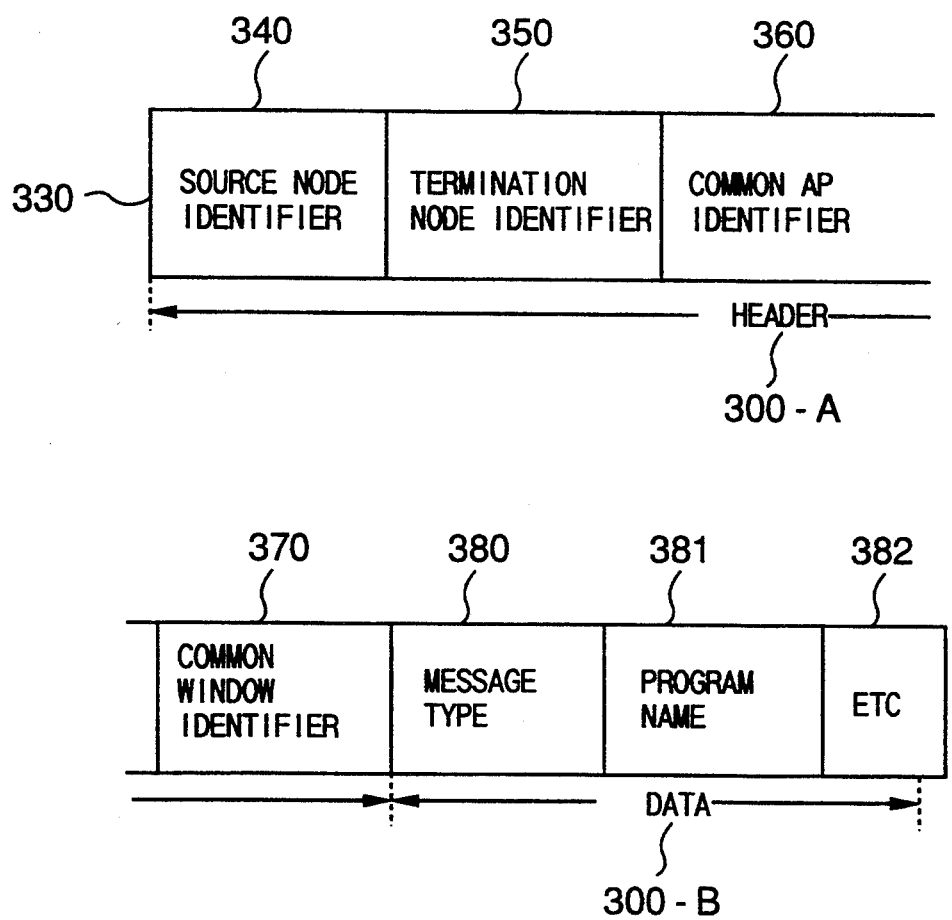
FIG. 6 is a diagram showing a group work control protocol format used for data communication by a group work control program (200)

FIG. 6 shows a group work control data protocol 330. This data protocol (message) includes a header block 300-A (including fields 340, 350, 360 and 370) and a data block 300-B (including fields 380, 381 and 382). Data transfer among the group work control programs 200 is performed using this protocol.

The header block includes a source node identifier field 340, a termination node identifier field 350, a common AP identifier field 360 and a common window identifier field 370.

In the source node identifier field 340, there is set a participant identifier Pa-ID of the user of the work station participating in the group working and issued the data. The termination identifier field 350 has set therein the participant identifier of the work station (participant) located at the termination of the data transmission up to which the data is to be transmitted forwardly. In the common AP identifier field 360, there is set the common AP identifier of the application program APi of the group use mode which is to process the data. Finally, the common window identifier field 370 has set therein the common window identifier 290 of the group working window in which the data originated.

As the participant identifier Pa-ID, the number peculiar or intrinsic to each group work control program can be used. Assuming that a certain work station has newly participated in .the group working, the group work control program of the this new work station inquires all the other participants (group work control programs of the other work stations) for an idle or unoccupied number to be used as the participant identifier for the new participant. Upon reception of the replies from the other work stations to the above inquiry, the received data processing module 230 of the new participant work station determines its own participant identifier Pa-IDj, whereby a participation informing message containing this participant identifier Pa-IDj and a participant name is sent to all the other participants.

In the group working system according to the present invention, a logical ring-like communication path for the group working information is formed on the network 50 which interconnects the work stations. Further, the group work control program of each work station has a group work configuration table for storing the identifiers of all the participants, in which a flag indicating the termination node is set in correspondence to the participant identifier Pa-ID of the adjacent work station located downstream as viewed in a predetermined direction of data flow on the above-mentioned logical communication path. By virtue of this arrangement, each of the participants who desires to transfer their own data to the other participants can set the participant identifier Pa-IDx to which a flag is set in the above-mentioned group work configuration table in the termination node identifier field 350 of the message, and then send the message to the succeeding station on the aforementioned logical communication path. Parenthetically, data management of the group work configuration table is performed by the received data processing module 230, which is referenced by the input virtualization module 210 for editing the header of the message or protocol used for transmission of the input data.

Figure 7:
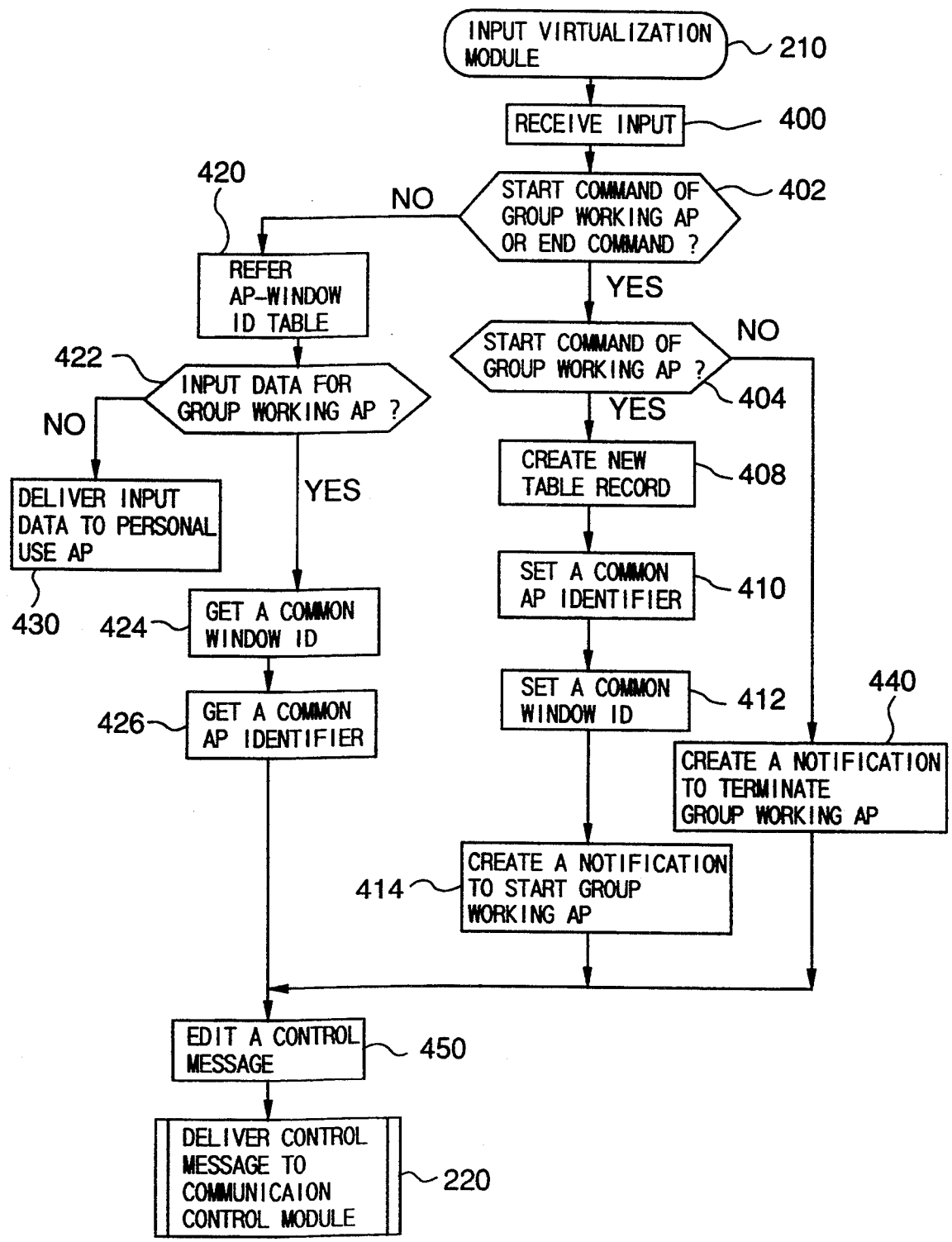
FIG. 7 is a flow chart illustrating functions of a input virtualization module (210)

FIG. 7 illustrates, in flow chart form, functions of the input virtualization module 210 of the group work control program 200.

The input virtualization module 210 receives input data (or commands) from the input device such as the keyboard 180-A or mouse 180-B through the medium of the window system 190. Upon reception of these input data (step 400), it is decided whether the input data represents either a start command for a group working AP or an end command therefor (step 402). If so, a decision is then made as to whether or not the group working AP start command is indicated (step 404).

When the decision in the step 404 results in affirmative answer (YES), a record for the AP which is to undergo newly the group working is generated in the AP-window identifier table 270 (step 408), whereon an unoccupied number of the common AP identifier is searched by consulting the AP-window identifier table 270 to thereby set the number as found as the common AP identifier 320 for the newly generated record mentioned above (step 410). Subsequently, the common window identifier 290 of a window in which the group working AP is to operate is newly set (step 412). A record containing the information mentioned above is registered in the AP-window identifier table 270, and a group working AP start notification is generated (step 414).

When the input in the decision step 402 is the group working AP end command, a group working AP end notification is generated (step 440).

On the other hand, when the input data in the decision step 402 represents neither the group working AP start command nor the group working AP end command, the AP-window identifier table 270 is referenced (step 420). Each of the input data is affixed with the window identifier (local window identifier) by the window system 190 in accordance with the contents of the window management table. Accordingly, when the AP-window identifier table 270 is consulted, as mentioned above, it is checked whether there exists the common window identifier or the common AP identifier which corresponds to the local window identifier affixed to the input data. If either one of them exists, a decision is made that the input data is destined for the group working AP (step 422).

When the input data is decided to be for the group working AP, the common window identifier pertinent to the input data is determined on the basis of the AP-window identifier table (step 424), and then the corresponding common AP identifier is obtained (step 426). The header 300-A is created by using these identifiers and then added with the input data, whereby the group work control data protocol (message) 330 shown in FIG. 6 is generated (step 450). This message is then transferred to the communication control module (step 220).

When it is found in the decision step 422 that neither the common window identifier nor the common AP identifier which corresponds to the local window identifier affixed to the input data exists in the AP-window identifier table 270, decision is then made that the input data is destined for an AP for the personal use, whereupon the input data is transferred to a relevant AP destined for personal use (step 430).

Figure 8:
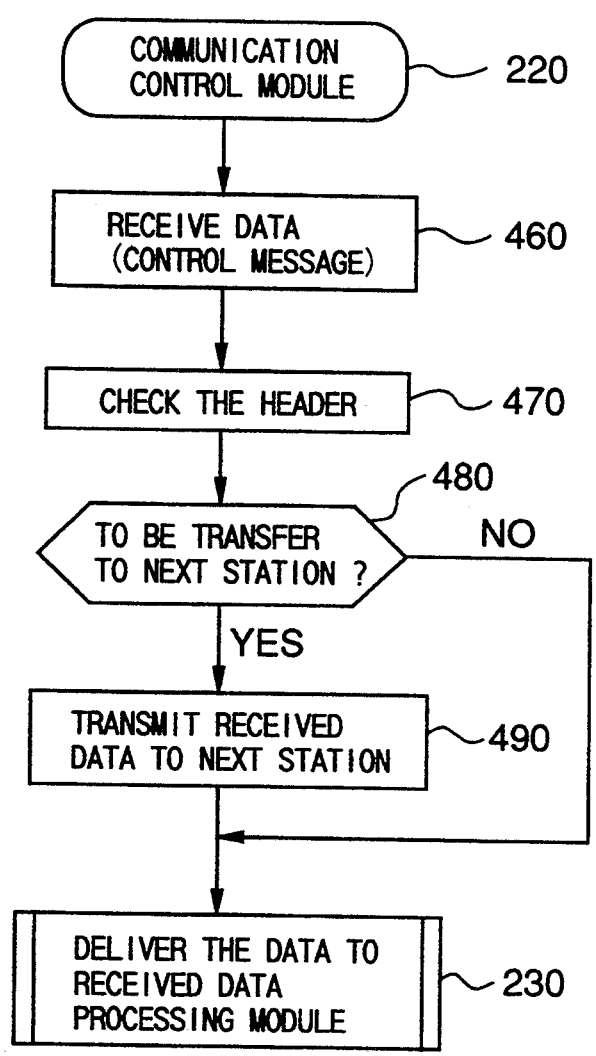
FIG. 8 is a processing flow chart illustrating functions of a communication control module (220)

FIG. 8 illustrates in processing flow chart functions of the communication control module 220.

The data received by the communication module 220 is in the form of the group work control data protocol 330. Upon reception of the input data (step 460), the communication control module 220 reads the header 300-A affixed to the input data (step 470) and makes a decision on the basis of the termination node identifier 350 contained in the header as to whether or not the data is to be transferred to the succeeding work station (group work control program) in a step 480. Unless the termination node identifier 350 coincides with the participant identifier of the associated work station (i.e., the group work control program 200 associated with the communication control module 220 now under consideration), a copy of the data mentioned above is transmitted to the succeeding station (group work control program 200') in a step 490. Thereafter, the data is transferred to the received data processing module 230.

On the other hand, when the termination node identifier of the input data coincides with the participant identifier of the associated work station (group work control program 200) a, decision is made that the data issued by the associated work station itself is received as the input data after having made a round along the communication path. In this case, the data is delivered immediately to the received data processing module 230 without sending it to the succeeding station.

Figure 9:
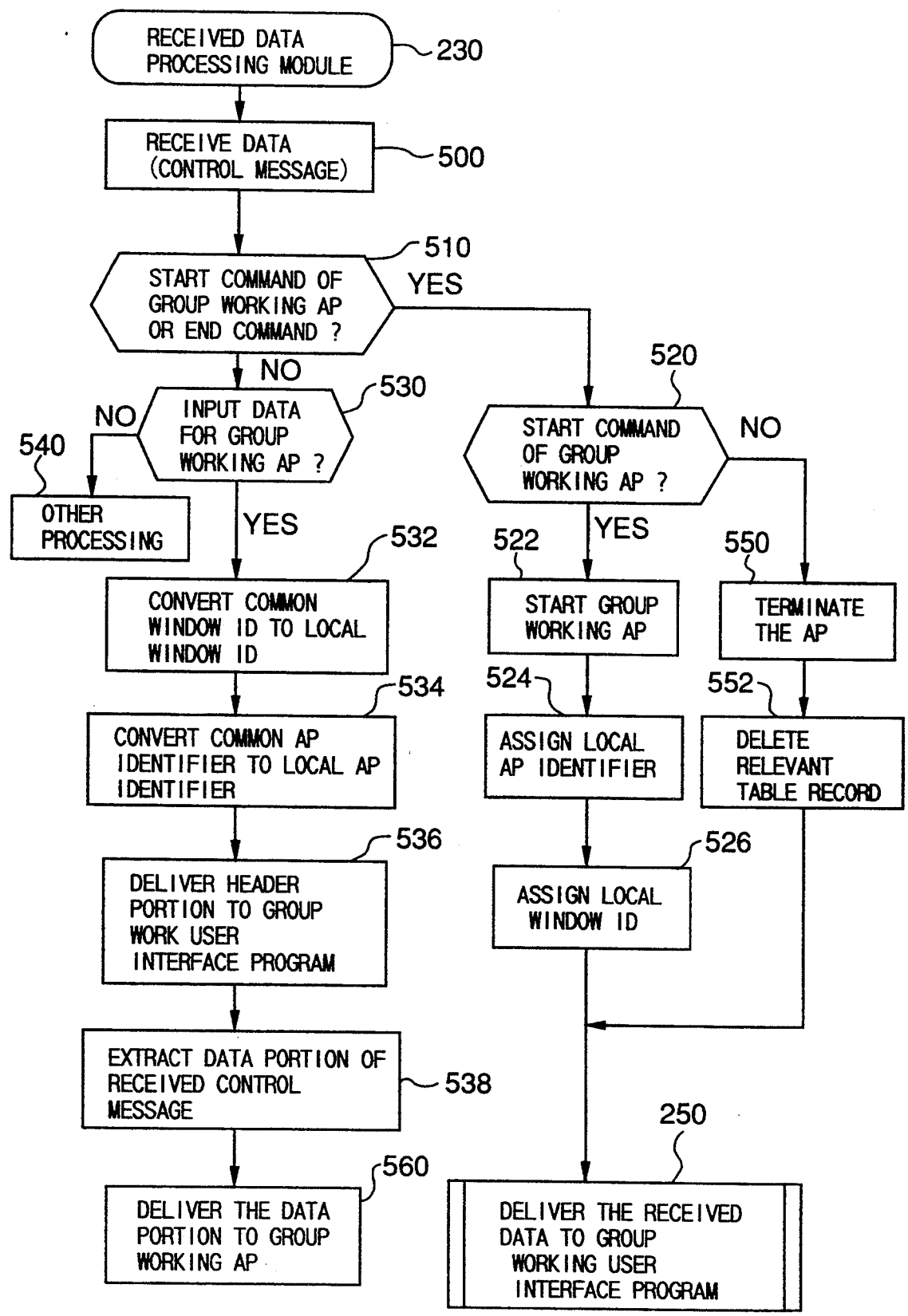
FIG. 9 is a flow chart illustrating an input data processing-procedure executed by a received data processing module (230)

FIG. 9 illustrates in a flow chart an input data processing procedure in the received data processing module 230.

Upon reception of input data from the communication control module 220 (step 500), the received data processing module 230 checks the content of the message type field 380 of the group work control data protocol 330, to thereby make a decision as to whether the input data as received represents either a group working AP start command or a group working AP end command (step 510).

If so, it is then decided whether or not the input data represents the group working AP start command (step 520).

Unless the input data is the group working AP start message, this means that the data of concern indicates the group working AP end command. In that case, the group working end processing of the relevant AP is executed (step 550), and the record pertinent to the AP undergone the group working end processing is deleted from the AP-window identifier table 270 (step 552).

When the input data represents the group working AP start command, the group working start processing is performed for the relevant AP (step 522). More specifically, the AP-window identifier table 270 is referenced for finding out an unoccupied number for the local AP identifier to thereby assign the local AP identifier to the above-mentioned AP (step 524). Subsequently, a local window identifier is assigned to the group working window in which the above-mentioned AP is to run (step 526). After completion of the processings described above, the input data is delivered to the group working user interface program 250.

In case the data received in the step 500 is neither the group working AP start command nor the group working AP end command, the type code field of the group work control data protocol 330 is checked, to thereby decide whether the input data is destined for an AP (step 530). If so, the input data is delivered to other relevant processing routine such as a utility program or the like (step 540).

When it is found that the input data is for the group working AP, the AP-window identifier table 270 is referred to for thereby converting the value of the common window identifier 370 contained in the header 300-A of the input data to the local window identifier (step 532), while converting the value of the common AP identifier 360 to the local AP identifier (step 534), and the header content of the input data is delivered to the group working user interface program 250 (step 536). Besides, from the input data constituting the group work control data protocol 330, unnecessary portions such as header and others are eliminated (step 538), and then the input data is delivered to the relevant AP destined for the group use or work (step 560).

Figure 10:
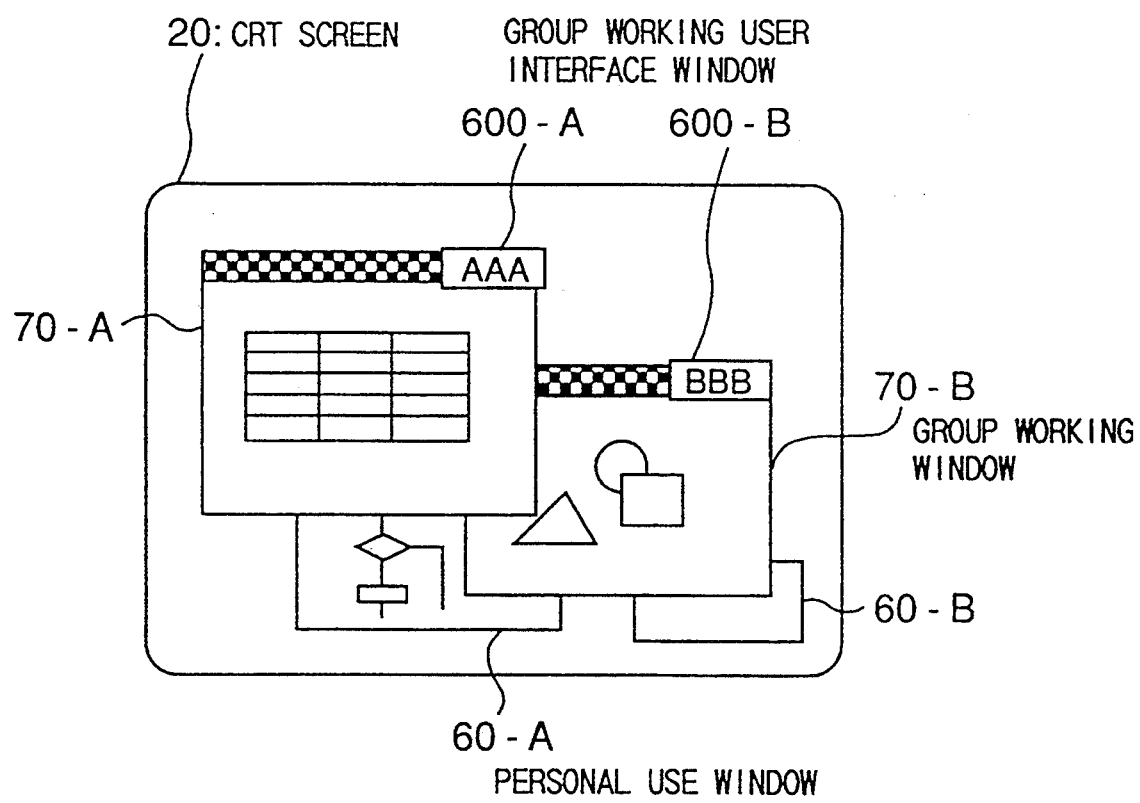
FIG. 10 is a diagram showing an example of display generated on a CRT screen in a work station in the course of executing a group working user interface program.

FIG. 10 is a view showing an example of display generated on a CRT in a work station by the group working user interface program 250 described above in the course of performing group work.

As can be seen in the figure, there are displayed on the CRT screen of the work station the group working window 70 (70-A, 70-B) into which the result of processing performed by a group working AP is output and a personal use window 60 (60-A, 60-B) into which results of processing performed by an AP operated personally by the user of each work station independent from the group working are output.

According to the teaching of the present invention, there are displayed the group working user interface windows 600 (600-A, 600-B) which correspond to the group working windows 70, respectively, of those mentioned above. Each of the group working user interface windows 600 may bear a predetermined positional relationship to the corresponding group working window.

In each of the group working user interface windows 600, there are displayed the name of the user who is performing input operation to the corresponding group working window 70 or identification information such as node ID number for specifying the work station in which the above-mentioned input operation is being performed. With this arrangement, it is possible to determine discriminatively on a window-by-window basis who is now in the course of performing the input operation. In this conjunction, the group working user interface window 600 may be generated integrally with the group working window, wherein the identification information may directly be displayed in the group working window.

In the case of the group working system according to the instant embodiment, the PO control program described hereinbefore by reference to FIG. 4 is provided as the utility program 260 so that each user can make use of his or her own point object in the course of the group working for each associated group working AP or for each associated group working window.

These pointing objects may be assigned with colors or shapes peculiar to the individual users, respectively, so that it can be decided who is using which of the pointing objects. To this end, the color of the above-mentioned group working user interface window 600 may be same as that of the pointing object of the user who is currently performing the input operation to the group working window 70, so that the user who is performing the input operation can be identified by the color of the group working user interface window.

Alternatively, the color of a frame of the group use window 70 may be selected same as that of the pointing object of the user who is currently performing the input operation.

Figure 11:
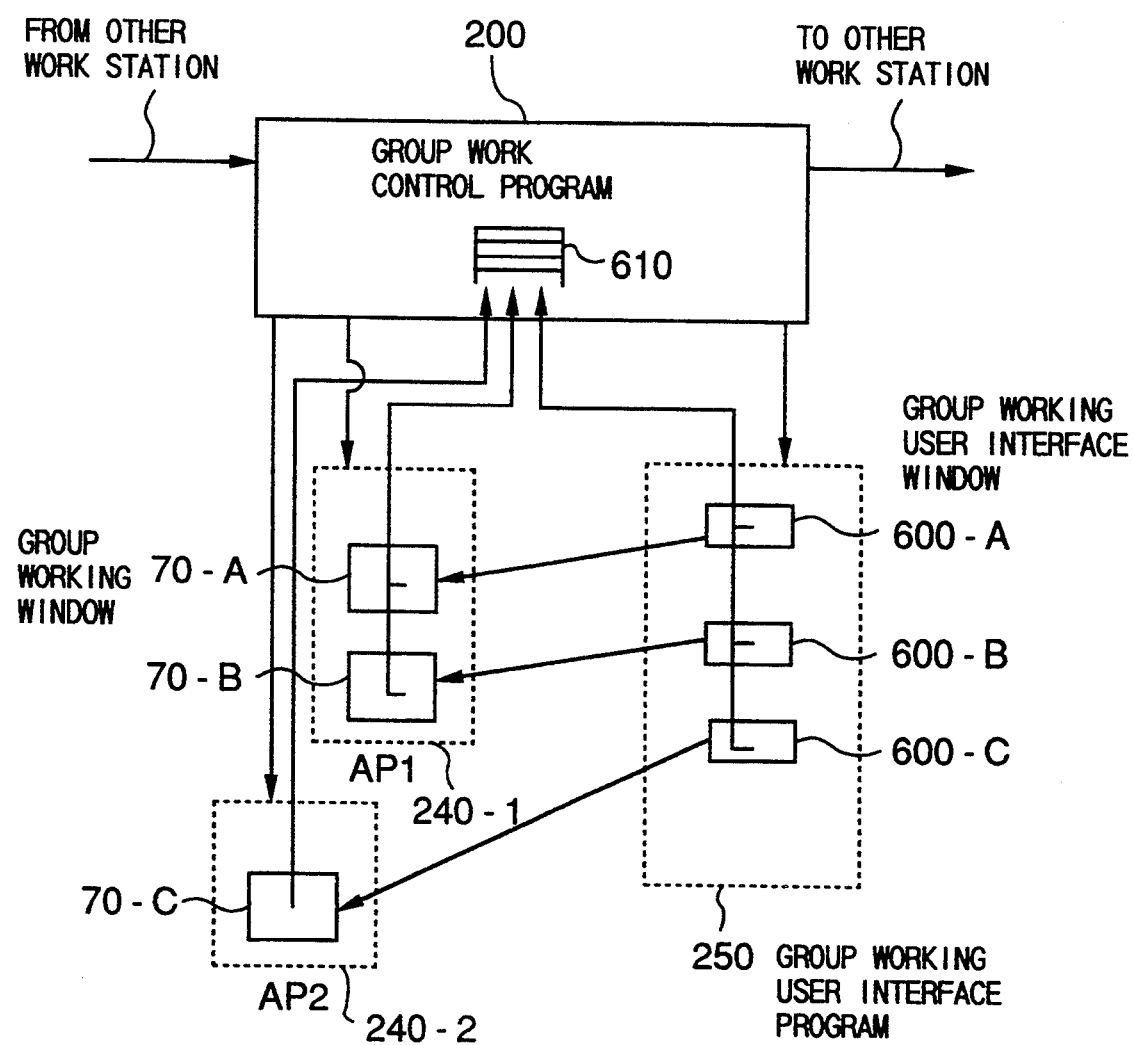
FIG. 11 is a diagram for illustrating data transfers among a group working user interface program, a group work control program and an application program.

FIG. 11 illustrates relations or associations among the group working user interface program 250, the group work control program 200 and the APs 240.

The group work control program 200 is in charge of managing or controlling a plurality of APs 240 (240-1, 240-2) and one group working user interface program 250. Each of the APs 240 runs within each associated window or in a plurality of windows 70 (70-A, 70-B, 70-C), wherein the result of data processing is output in the window or windows.

The group working user interface program 250 prepares the group working user interface windows 600 (600-A, 600-B, 600-C) in correspondence to the group working windows 70 (70-A, 70-B, 70-C), respectively, in which the group working APs 240 (240-1, 240-2) run.

Each of the group working user interface windows 600 is displayed on the CRT screen in accompanying the associated group working window 70 so long as the latter is being generated on the CRT screen, to thereby make available for the user of the work station the service information for discriminating the user who is currently performing the input operation to the associated group working window 70. When any one of the group working windows 70-i is erased from the CRT screen upon ending of a group working AP, the group working user interface window 600-i associated with the above-mentioned group working window 70-i is also erased from the CRT display.

Data transfer or delivery from the AP 240 and the group working user interface program 250 to the group work control program 200 is performed through the medium of a FIFO (First In/First Out) file 610, as is shown in FIG. 11. More specifically, the inter-program data transfer mentioned above is realized in such a manner in which the AP 240 or the group working user interface program 250 writes data in the FIFO file 610, whereon the group work control program reads the data from the FIFO file 610.

Further, the data transfer to the AP 240 or to the group working user interface program 250 from the group work control program 200 is performed by making use of a FIFO file (not shown) provided by the group work control program 200.

Figure 12:
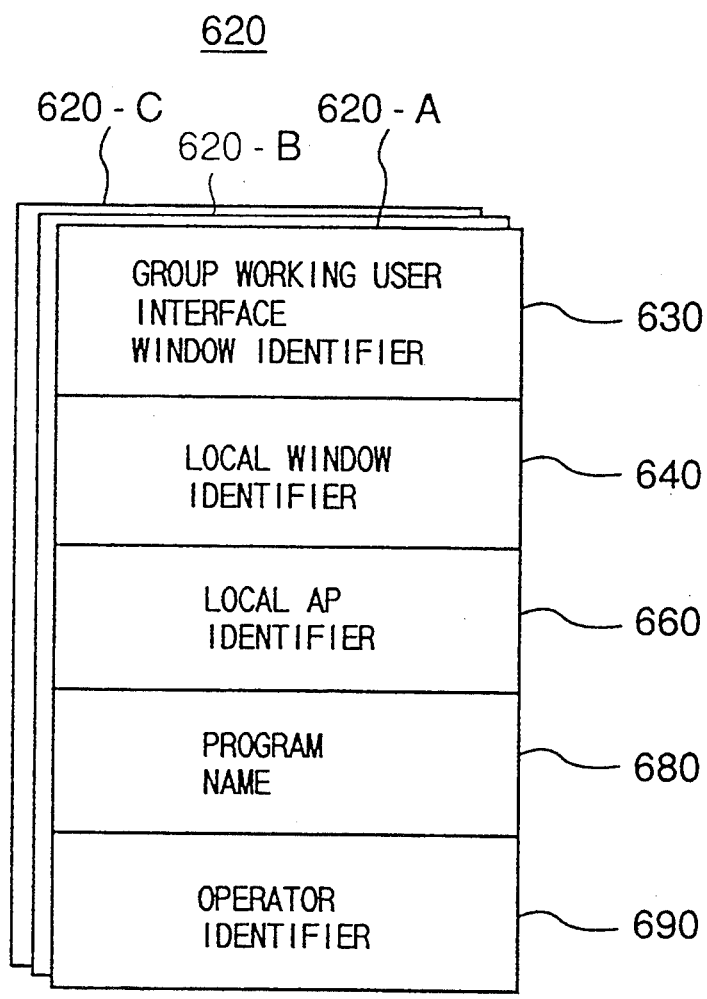
FIG. 12 is a diagram showing a structure of a group working user interface information table which is included in a group working user interface program.

FIG. 12 shows a structure of a group working user interface information table 620 which is controlled by the group working user interface program 250.

In the group working user interface window information table 620, there are registered a plurality of table records 620-A, 620-B and 620-C each including a group working user interface window identifier filed 630, a local window identifier filed 640, a local AP identifier filed 660, a program name filed 680 and an operator identifier filed 690, respectively.

Each of these table records 620-i is prepared in correspondence to the group working user interface window 600, wherein the local window identifier 640, the local AP identifier 660 and the program name 680 are supplied from the group work control program 200 at the time when operation of the group working AP is started. By way of example, in the group working user interface window identifier field 630 of the table record 620-A, the identifier of the group working user interface window 600-A is set, while set in the field 640 is the window identifier of the group working window 70-A which is paired with the above-mentioned group working user interface window 600-A. The group working user interface window 630 is assigned to the window system 190 at a time point when the group working user interface window 600-A is displayed on the CRT screen and a corresponding message is issued to the group working user interface program 250. In the operator identifier filed 690, there is set the participant identifier of a user who has performed the latest input operation to the group working window 70-A.

Figure 13:
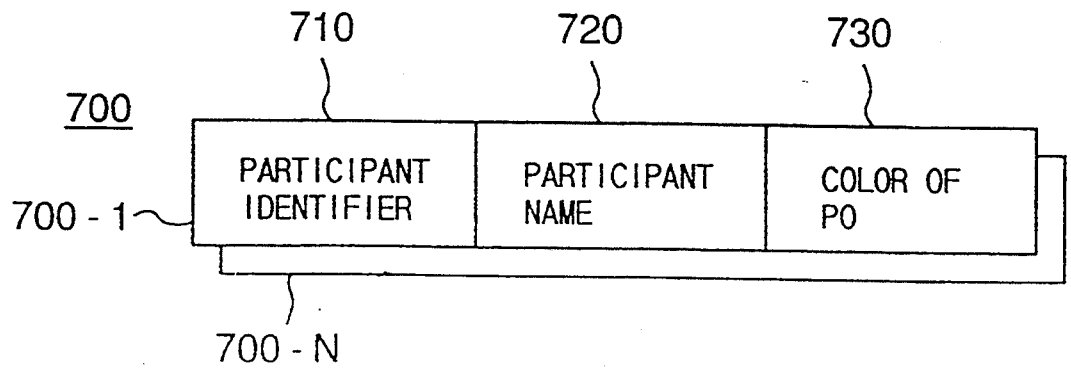
FIG. 13 is a diagram showing a structure of a participant information table included in the group working user interface program.

FIG. 13 shows a structure of a participant information table 700 which is adapted to be managed or controlled by the group working user interface program 250.

Registered in the participant information table 700 are a plurality of table records 700-1 to 700-N each of which includes a participant identifier filed 710, a participant name field 720 and a pointing object color field 730. Each of the table records is provided for each of the participants participating in the group work (conference in the case of the instant embodiment) on a one-by-one basis. Every time a newcomer takes part in the group work (or conference), a new table record is generated with the fields thereof being placed with the information of the new participant by the group work control program 200.

By way of example, it is assumed that the received data processing module 230 of the group work control program 200 has received a participation informing notification indicating a new participant identifier Pa-ID and a participant name from other work station. Then, the received data processing module 230 delivers the information mentioned above to the group working user interface program 250 which then responds thereto by generating a new table record correspondingly.

The participant identifiers Pa-ID is the identifier intrinsic to each user or participant in the group work, i.e., intrinsic or peculiar to the group work control program 200 of each work station and has a capability of discriminatively identifying the source node in which the input data originates. In the case where each of the pointing objects is assigned with a color peculiar to each user, the peculiar color data of the pointing object is set in the PO color field of the table record peculiar to the user.

Figure 14:
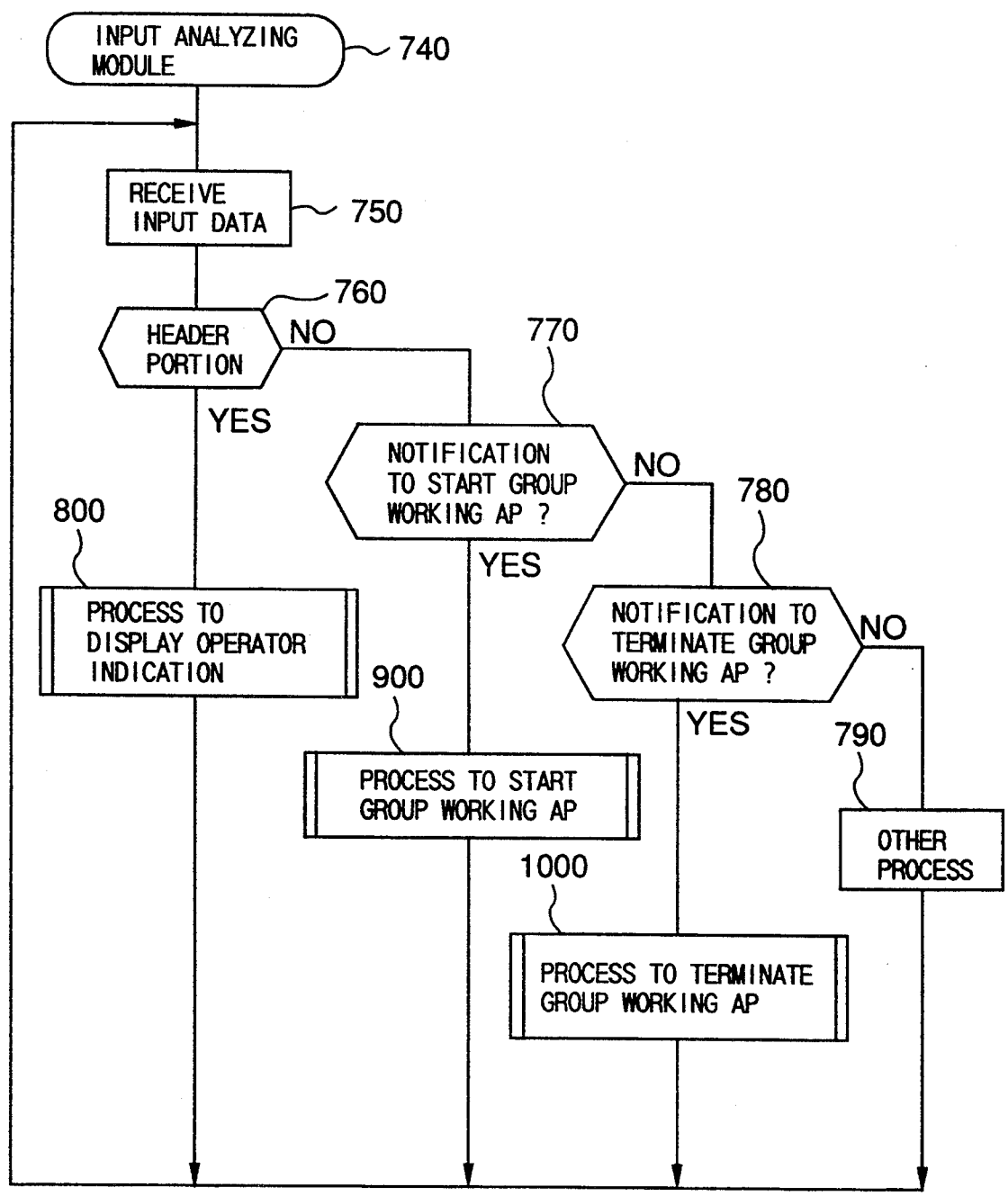
FIG. 14 is a flow chart for illustrating an input analysis processing module included in the group work user interface program.

FIG. 14 illustrates, in a flow chart, a processing routine 740 for analyzing the input data delivered from the group work control program 200, the analysis being realized as one of the functions of the group working user interface program 250.

This input data analyzing routine 740 serves for analyzing the input data received from the group work control program 200 (received data processing module 230) to select a processing routine which conforms to the content of the input data as analyzed. More specifically, referring to the figure, upon reception of data from the group work control program 200 in a step 750, a decision is then made as to whether or not the data as received coincides with the header information 300-A of the group work control data protocol 330 shown in FIG. 6 (step 760).

When coincidence is found between the received data and the header information of the group work control data protocol 330, an operator identifier indication processing routine is executed (step 800). Unless the received data coincides with the header of the group work control protocol 330, a decision is made on the basis of the information set in the message type field 380 of the input data as to whether or not the data is a message of start of a group working AP (step 770). By way of example, when a code indicating the start of a group working AP is set in the message type field 380, it is decided that the input data represents the command for starting a group working AP.

In response to the reception of the group working AP start message as the input data, a routine for starting the group working AP is executed (step 900). Unless the input data represents the group working AP start command, it is then decided whether the input data represents a command for ending a group working AP (step 780). This decision is equally performed on the basis of the message type code set in the message type field 380 of the received data. When the above decision results in that the received data represents the group working AP end command, a routine for the process to end the group working AP is executed (step 1000). If otherwise, other processing corresponding to the type of the input data is performed.

Figure 15:
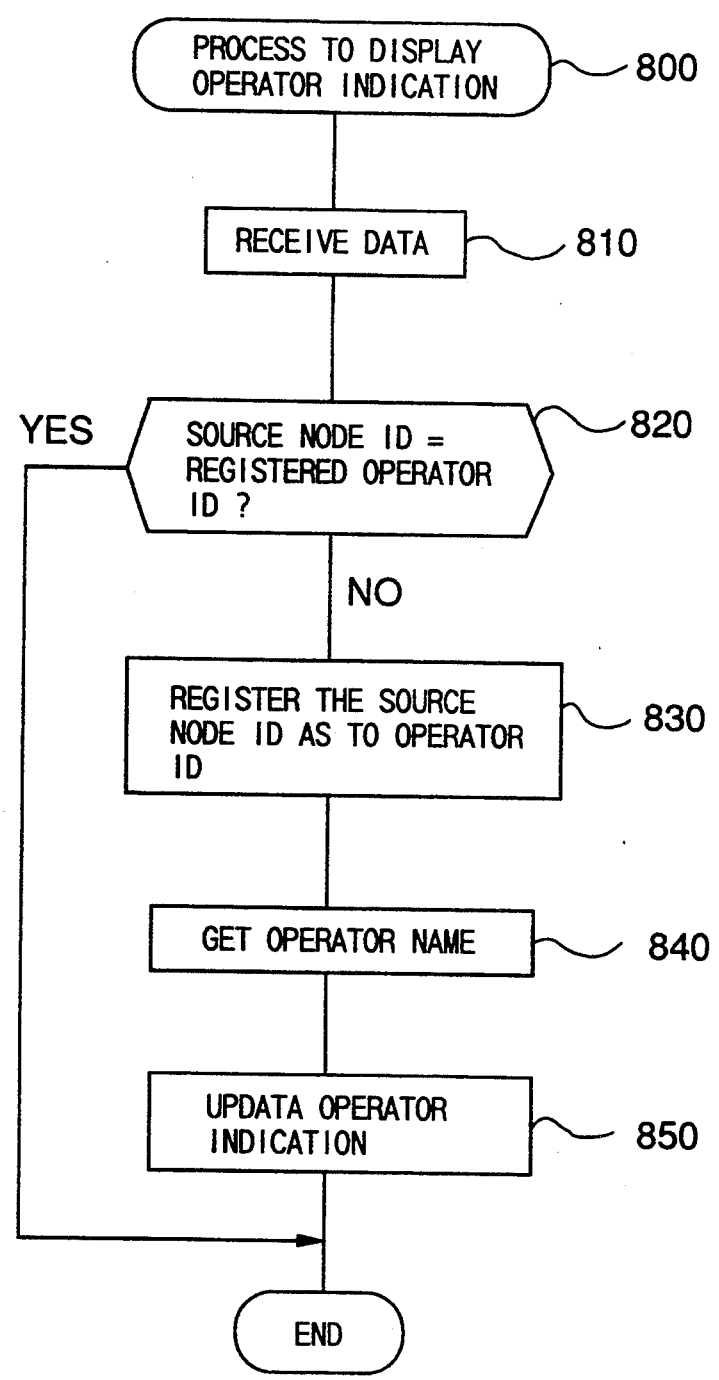
FIG. 15 is a flow chart for illustrating in detail an operator indication processing routine shown in FIG. 14.

FIG. 15 illustrates, in detailed flow chart form, the operator indication processing routine 800 shown in FIG. 14.

In the operator indication processing routine 800, header information of the input data is received from the input data analysis processing module 740 (step 810), to thereby specify the group working user interface window 600-i which accompanies the group working window 700-i indicated by the common window identifier 370 (or common AP identifier 360) contained in the header, whereupon decision is made as to whether or not the content of the operator identifier field 690 of the group working user interface information table record 620-i which corresponds to the specified interface window 600-i coincides with the content of the source node identifier field 340 contained in the aforementioned header information (step 820).

The group working user interface window 600-i can be specified by referring to first the AP-window identifier table 270 to thereby obtain the local window identifier 280 which corresponds to the aforementioned common window identifier 370 and then consulting the group working user interface information table 620 to find the table record 620-i having the above-mentioned local window identifier 280 in the field 640, for thereby obtaining the group working user interface window identifier 630 from the table record as found.

In the case where coincidence is found between the operator identifier 690 of the group working user interface information table record 620-i and the source node identifier field 340 of the aforementioned header, decision is then made to the effect that change of display of the operator indication is unnecessary in the user interface window 600-i, whereupon this routine comes to an end.

On the other hand, in case discrepancy is found between the operator identifier 690 and the source node identifier 340, processing described below is performed.

At first, a value of the source node identifier 340 indicated in the data header is placed in the operator identifier field 690 of the group working use interface information table record 620-i (step 830). Subsequently, by referring to the participant information table 700, the data record 700-i containing the participant identifier 710 which coincides with the source node identifier 340 mentioned above is found, to acquire the participant name 720 which corresponds to the source node identifier 340 (step 840), whereon the operator indication in the group working user interface window 600-i corresponding to the group working window 70-i for which the data input operation has been performed is changed to the content which indicates the participant name 720 mentioned above (step 850).

Figure 16:
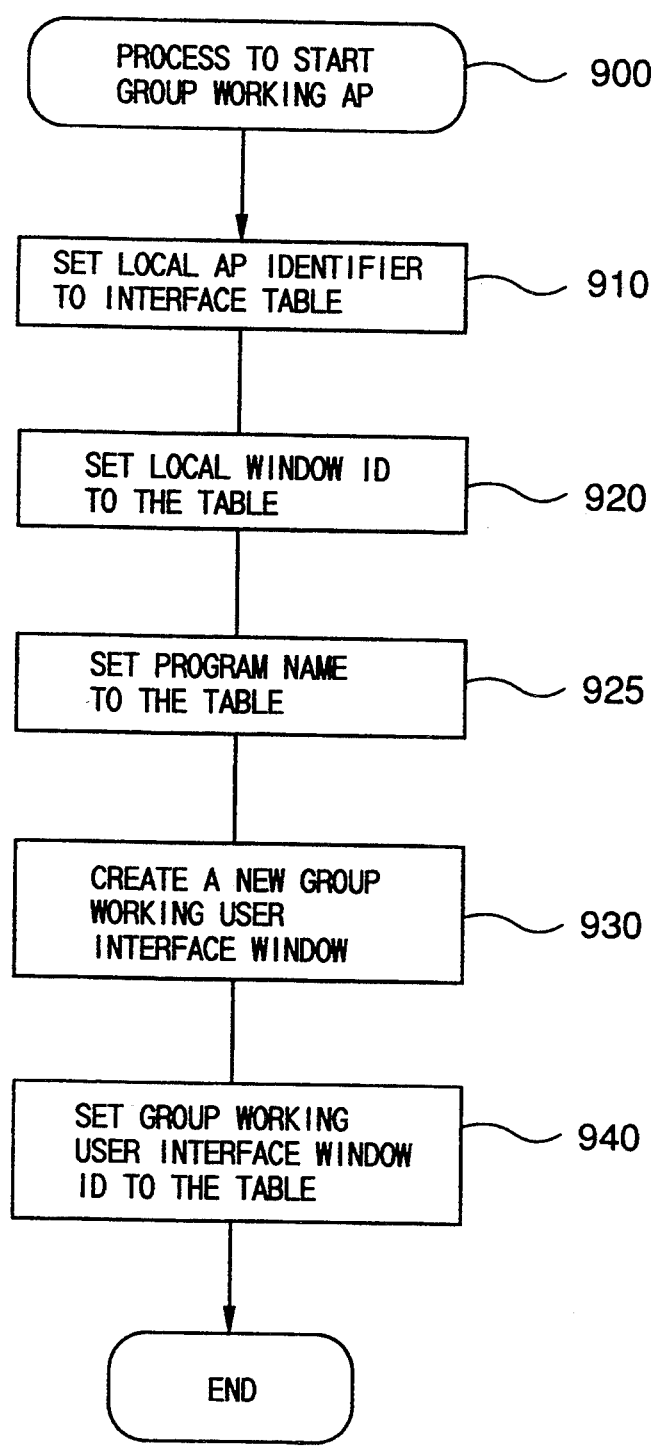
FIG. 16 is a flow chart for illustrating in detail a routine for processing start of a group working AP shown in FIG. 14.

FIG. 16 illustrates in flow chart in detail a routine 900 for processing the start of the group working AP shown in FIG. 14.

When a user commands the start of a group working AP in conjunction with one window 70-k, the input virtualization module 210 responds to the command to generate command data for indicating the start of group working AP, and the group work control program 200 performs processing for activating a relevant group working AP. At that time, the group working user interface program 250 which has received the command data for the start of the group working AP from the received data processing module 230 generates a group working user interface window 600-k to be added in the group working window 70-k generated on the CRT screen in response to the start of the group working AP in a manner described below.

Namely, in response to reception of the group working AP start command, a table record 620-k to be newly registered in the group working user interface information table 620 is generated, and the local identifier of the AP which started the group working is set in the filed 660 (step 910), while the local window identifier is set in the field 640 (step 920) with the program name of the AP started the group working being set in the field 680 (step 925), respectively. Subsequently, a new group working user interface window 600-k is generated (step 930). In that case, the window system 190 assigns a relevant window identifier to the group working user interface window 600-k generated newly, and the window identifier is set in the interface window identifier field 680 of the aforementioned table record 620-k (step 940).

Figure 17:
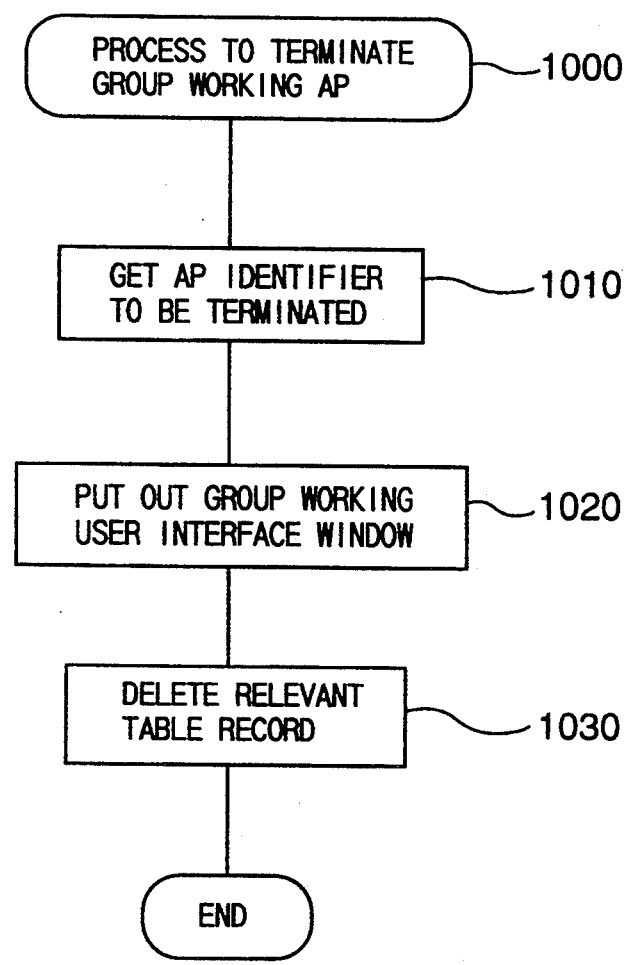
FIG. 17 is a flow chart for illustrating in detail routine for a group working AP end processing shown in FIG. 14.

FIG. 17 illustrates in flow chart in detail the routine 1000 for a group working AP end processing shown in FIG. 14.

When a user commands the end of a group working AP, the group work control program 200 performs a processing for ending an application program AP corresponding to the end command. At that time, the group working user interface program 250 which receives the command data of the group working AP end command from the received data processing module 230 performs a process for deleting the group working user interface window 600-i which corresponds to the group working window 70-i to be deleted upon ending of the group working AP mentioned above in a manner described below.

Namely, upon receiving the group working AP end command, the local identifier of the AP to be released from the group work is acquired from the command data (step 1010). Subsequently, by referring to the group working user interface information table 620, the table record 620-i having the local AP identifier in the field 660 is found, and then the group working interface window 600 specified by the user interface window 630 of the table record 620-i is deleted (step 1020). Finally, the table record 620-i is deleted from the group working user interface information table 620 (step 1030).

As will now be appreciated from the foregoing description, according to the teachings of the present invention that in a group working system, interface windows paired with group working windows are generated at work stations, respectively, and when input operation is performed to a given one of the group working windows, the interface window which corresponds to the given group working window displays therein information which specifies the operator who have performed the input operation or the relevant work station, the participants taking part in a group work can easily know who is operating currently the group working window, whereby the group work can be progressed smoothly.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A group working system including a plurality of terminal apparatuses interconnected through a communication network, each of said terminal apparatuses having a multi-window function for generating a plurality of windows on a display screen and executing application programs on window-by-window basis, comprising:

input means for designating one of said plural windows generated on said display screen and inputting information of data or command for said designated window;

storage means for storing for each of said plural windows generated on a display screen state information indicating whether each of said plural windows is in a state of group working mode in which data processing for a group work is executed in cooperation with the other terminal apparatuses or in a state of local mode in which data processing for a local work is executed independent of other terminal apparatuses;

control means responsive to inputting of information for one window in said group working mode for transferring said input information to an application program running within said one window and generating a message having a predetermined format and including said input information, which message is sent to at least one of the other terminal apparatuses, while upon reception of a message containing input information for said group work from other terminal apparatuses, said input information contained in said received message is delivered to an application program running within one of said plural windows specified by header information of said received message;

each of said messages containing at least a first identifier indicating a source node issued said message and a second identifier for specifying an application program which is to execute data processing conforming to the input information contained in said message or corresponding window within which said application program is to run; and interface means for receiving the first identifier indicating the source node issued the message, said first identifier being contained in said message received from the other terminal apparatus, and outputting identification indication for indicating a terminal apparatus or user who is performing input operation to the window of said group working mode.

2. A group working system according to claim 1, wherein each of said terminal apparatuses includes second storage means for storing a correspondence relation between said first identifier and indication information for identifying the user performing operation for each of said terminal apparatuses participating in said group work, and wherein said interface means makes reference to said second storage means for acquiring the indication information corresponding to the first identifier received from said control means, said indication information being output onto said display screen as said identification indication.

3. A group working system according to claim 2, wherein said second storage means of each of said terminal apparatuses stores information of graphic element and/or color peculiar to the user performing operation as said indication information which corresponds to said first identifier, and wherein said interface means makes reference to said second storage means for thereby acquiring to graphic element and/or color information corresponding to said first identifier received from said control means, said graphic element and/or color information being output onto said display screen as said identification indication.

4. A group working system according to claim 1, each of said terminal apparatuses including means for generating an additional window on said display screen in correspondence to each window which is in said group working mode;

wherein said interface means receives from said control means the second identifier specifying an application program or a window, said second identifier being contained in the message received from the other terminal apparatus; and wherein said identification indication for identifying the terminal apparatus or the user performing said input operation is output to the additional window which corresponds to the window of the group working mode specified by said second identifier.

5. A group working system according to claim 4, wherein each of said terminal apparatuses includes second storage means for storing a correspondence relation between said first identifier and indication information for identifying the user performing operation for each of said terminal apparatuses participating in said group work, and wherein said interface means makes reference to said second storage means for acquiring the indication information corresponding to the first identifier received from said control means, said indication information being output to said additional window as said identification indication.

6. A group working system according to claim 4, wherein said second storage means of each of said terminal apparatuses stores information of graphic element and/or color peculiar to the user performing operation as said indication information which corresponds to said first identifier, and wherein said interface means makes reference to said second storage means for thereby acquiring the graphic element and/or color information corresponding to said first identifier received from said control means, said graphic element and/or color information being output to said additional window as said identification information.

7. A group working system according to claim 1, said control means of each of said terminal apparatuses including means responsive to inputting of information to one window in the group working mode from said input means to thereby deliver the first identifier assigned previously to the terminal apparatus to said interface means, wherein upon performing input operation to the window of the group working mode in the terminal apparatus, the identification indication identifying the terminal station or user thereof is output onto the display screen.

8. A group working system according to claim 4, said control means of each of said terminal apparatuses including means responsive to inputting of information for one window of the group working mode from said input means to thereby deliver the first identifier assigned previously to the terminal apparatus and the second identifier for identifying said one window or an application program being executed within said one window to said interface means;

wherein upon performing input operation to the one window of the group working mode in the terminal apparatus, an identification indication indicating the terminal apparatus or the user thereof if output to the additional window corresponding to the one window of said group working mode as specified by said second identifier.

9. A group working system including a plurality of terminal apparatuses interconnected through a communication network, each of said terminal apparatuses having a multi-window function for generating a plurality of windows on a display screen and executing programs on window-by-window basis, comprising:

input means for designating one of said plural windows generated on said display screen and inputting information of data or command for said designated window;

storage means for storing for each of said plural windows generated on a display screen state information indicating whether each of said plural windows is in a state of group working mode in which data processing for a group work is executed in cooperation with the other terminal apparatuses or in a state of local mode in which data processing for a local work is executed independent of other terminal apparatuses;

control means responsive to inputting of information for one window for executing data processing corresponding to said input information by a program which corresponds to said one window, making reference to said storage means to make decision whether one of said plural windows to which said information in inputted is in the state of group working mode and, if so, transmitting a message of predetermined format containing said input information to at least one of the other terminal apparatuses participating in the group work via said communication network, and responding to reception of a message containing input information for the group work from other terminal apparatuses for thereby executing a data processing corresponding to the input information contained in the message by a program specified by header information of said received message;

each of said messages containing at least a first identifier indicating a source terminal apparatus issued said message and a second identifier for specifying an application program which is to execute data processing conforming to the input information contained in said message or corresponding window within which said application program is to run; and interface means for receiving from said control means the first identifier indicating the source terminal apparatus issued the message when information input operation is performed for the window of the group working mode in any one of said terminal apparatuses, said first identifier being contained in said message transferred between the terminal apparatuses, and for outputting identification indication for indicating the terminal apparatus or a user who is performing input operation to the window of the group working mode, said identification indication being generated on the basis of said first identifier.

10. (Amended) A group working system according to claim 9, each of said terminal apparatuses including means for generating an additional window on said display screen in correspondence to each of said plural windows which is in the state of group working mode;

wherein said interface means receives from said control means a second identifier specifying an application program or a window, said second identifier being contained in the message received from the other terminal apparatus; and wherein said identification indication for identifying the terminal apparatus or the user performing said input operation is output to the additional window which corresponds to the window of the group working mode specified by said second identifier.

11. A group working system according to claim 9, wherein each of said terminal apparatuses includes second storage means for storing a correspondence relation between said first identifier and indication information for identifying the user performing operation for each of said terminal apparatuses participating in the group work, and wherein said interface means makes reference to said second storage means for acquiring indication information corresponding to the first identifier received from said control means, said indication information being output to said additional window as said identification indication.

12. A group working system according to claim 11, wherein said second storage means of each of said terminal apparatuses stores information of graphic element and/or color peculiar to the user performing operation as said indication information which corresponds to said first identifier, and wherein said interface means makes reference to said second storage means for thereby acquiring the graphic element and/or color information corresponding to said first identifier received from said control means, said graphic element and/or color information being output to said additional window as said identification indication.

13. Display control method performed in a terminal apparatus composing a group working system, said terminal apparatus being interconnected with at least one other terminal apparatus through a communication network and having a multiwindow function for generating a plurality of windows on a display screen and executing application programs on a window-by-window basis, said control method comprising the steps of:

storing for each of said plural windows generated on the display screen state information indicating whether each of said plural windows is in a state of group working mode in which data processing for a group work is executed in cooperation with the other terminal apparatus or in a state of local mode in which data processing for a local work is executed independent of other terminal apparatus;

inputting information of data or command for one window in the group working mode through an input device;

transferring in response to the inputting of information for one window in the group working mode, said input information to an application program running within said one window to execute a data processing conforming to the input information;

sending a first message having a predetermined format including header information and said input information to said the other terminal apparatus, said header information containing at least a first identifier indicating a source node apparatus issued said message and a second identifier for specifying an application program which is to execute data processing conforming to the input information contained in said message or corresponding window within which said application program is to run;

receiving a second message containing input information of data or command for the group work from said other terminal apparatus and executing a data processing conforming to the input information when the information was input through an input device of said the other terminal apparatus, said second message having the same format as said first message;

outputting to said display screen an identification indication for indicating the terminal apparatus or an user who is performing input operation to the window of said group working mode depending on the first identifier being contained in said first or second message.

14. A display control method according to claim 13, wherein said identification indication is output in a form of a graphic element and/or color information corresponding to said first identifier onto said display screen.

15. A display control method according to claim 13, wherein said identification indication is output to an additional window which is created on said display screen corresponding to the window of the group working mode specified by said second identifier.

16. A display control method according to claim 14, wherein said identification indication is output in a form of a graphic element and/or color information corresponding to said first identifier in said additional window.

* * * * *